United States Patent
Huang

(10) Patent No.: US 10,659,203 B2
(45) Date of Patent: May 19, 2020

(54) METHOD AND APPARATUS FOR TRANSMITTING DATA

(71) Applicant: Beijing Zhigu Rui Tuo Tech Co., Ltd, Beijing (CN)

(72) Inventor: Weicai Huang, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 0 days.

(21) Appl. No.: 15/167,965

(22) Filed: May 27, 2016

(65) Prior Publication Data

US 2016/0352486 A1 Dec. 1, 2016

(30) Foreign Application Priority Data

May 30, 2015 (CN) .......................... 2015 1 0290916

(51) Int. Cl.
| | | |
|---|---|---|
| H04L 5/00 | (2006.01) | |
| H04L 12/26 | (2006.01) | |
| H04L 1/00 | (2006.01) | |
| H04L 1/08 | (2006.01) | |

(52) U.S. Cl.
CPC .......... H04L 5/0048 (2013.01); H04L 1/0003 (2013.01); H04L 1/0009 (2013.01); H04L 1/0034 (2013.01); H04L 1/08 (2013.01); H04L 43/08 (2013.01); H04L 43/16 (2013.01)

(58) Field of Classification Search
CPC .... H04B 7/0626; H04B 7/0632; H04B 17/24; H04B 17/309; H04W 52/24; H04W 52/264

See application file for complete search history.

(56) References Cited

U.S. PATENT DOCUMENTS

| | | | |
|---|---|---|---|
| 5,691,978 A | 11/1997 | Kenworthy | |
| 6,317,854 B1 | 11/2001 | Watanabe | |

(Continued)

FOREIGN PATENT DOCUMENTS

| | | |
|---|---|---|
| CN | 1969473 A | 5/2007 |
| CN | 101150568 A | 3/2008 |

(Continued)

OTHER PUBLICATIONS

3GPP/ETSI. "Universal Mobile Telecommunications System (UMTS); Physical layer procedures (FDD)" Technical Specification. 3GPP TS 25.214 version 5.11.0 Release 5, Jun. 2005. Retrieved on May 25, 2016, 53 pages.

(Continued)

*Primary Examiner* — Hashim S Bhatti
*Assistant Examiner* — Abdullahi Ahmed
(74) *Attorney, Agent, or Firm* — Amin, Turocy & Watson, LLP

(57) ABSTRACT

Data, transmission comprises when sending data to a receiver through a channel, receiving, through the channel, at least one reference signal sent by the receiver; and resending the data according to the at least one reference signal. The present application further discloses other methods and apparatuses for transmitting data. Using the various embodiments, an issue that quality of service (QoS) cannot be ensured due to a lag of a reference signal in conventional data transmission is avoided, and the quality of data transmission can be improved.

20 Claims, 11 Drawing Sheets

(56) References Cited

U.S. PATENT DOCUMENTS

| | | | |
|---|---|---|---|
| 7,593,486 B2* | 9/2009 | Jeong | H04B 7/0689 375/260 |
| 8,121,555 B2* | 2/2012 | Miao | H04L 1/1812 455/127.1 |
| 8,767,546 B2* | 7/2014 | Nguyen | H04L 1/1825 370/232 |
| 8,842,701 B2* | 9/2014 | Strait | H04W 56/00 370/503 |
| 9,537,637 B2* | 1/2017 | Nam | H04L 1/1819 |
| 2006/0050698 A1 | 3/2006 | Aytur et al. | |
| 2006/0203780 A1* | 9/2006 | Terry | H04W 24/02 370/335 |
| 2010/0027450 A1 | 2/2010 | Montojo et al. | |
| 2010/0035646 A1* | 2/2010 | Miao | H04L 1/1812 455/522 |
| 2010/0260078 A1 | 10/2010 | Kim et al. | |
| 2012/0076040 A1* | 3/2012 | Hoshino | H04W 24/10 370/252 |
| 2012/0113904 A1* | 5/2012 | Anderson | H04W 72/042 370/329 |
| 2012/0243430 A1* | 9/2012 | Song | H04L 1/0015 370/252 |
| 2013/0235721 A1 | 9/2013 | Nguyen et al. | |
| 2015/0009924 A1* | 1/2015 | Takano | H04L 5/0035 370/329 |
| 2015/0016309 A1 | 1/2015 | Fang et al. | |
| 2015/0045000 A1* | 2/2015 | Kim | G06F 3/0488 455/411 |
| 2015/0295698 A1* | 10/2015 | Zhang | H04L 5/00 370/281 |
| 2015/0351058 A1* | 12/2015 | Seo | H04W 56/002 370/350 |
| 2017/0033905 A1 | 2/2017 | Huang | |
| 2018/0019857 A1 | 1/2018 | Kazmi et al. | |

FOREIGN PATENT DOCUMENTS

| | | |
|---|---|---|
| CN | 101611562 A | 12/2009 |
| CN | 102804895 A | 11/2012 |
| CN | 103259583 A | 8/2013 |
| CN | 105227265 A | 1/2016 |

OTHER PUBLICATIONS

Office Action dated Oct. 6, 2017 for U.S. Appl. No. 15/167,960, 20 pages.

Chinese Office Action dated Apr. 11, 2018 for Chinese Application No. 201510290815.2, 5 pages.

Office Action dated May 10, 2018 for U.S. Appl. No. 15/167,960, 20 pages.

Chinese Office Action dated Oct. 31, 2018 for Chinese Application No. 201510290916.X, 9 pages (with translation).

Office Action dated Jan. 30, 2019 for U.S. Appl. No. 15/167,960, 19 pages.

Office Action dated Sep. 26, 2019 for U.S. Appl. No. 15/167,960, 34 pages.

Final Office Action received for U.S. Appl. No. 15/167,960 dated Mar. 2, 2020, 78 pages.

\* cited by examiner

METHOD AND APPARATUS FOR TRANSMITTING DATA

RELATED APPLICATION

The present application claims the benefit of priority to Chinese Patent Application No. 201510290916.X, filed on May 30, 2015, and entitled "Method and Apparatus for Transmitting Data", which application is hereby incorporated into the present application by reference herein in its entirety.

TECHNICAL FIELD

The present application relates to the field of communication technologies, and, for example, to a method and an apparatus for transmitting data.

BACKGROUND

In future wireless communication services, high requirements are raised on quality of service (QoS) of an end-to-end service, for example, in scenarios such as remote control of surgical equipment or remote control of a vehicle, an end-to-end latency needs to be not greater than 1 ms, so as to avoid a sense of a lag in an operation process. To meet the extremely high QoS requirements, multiple technical challenges exist, one of which is to accurately determine channel quality to determine a proper means for data transmission.

In an existing Long Term Evolution (LTE) time division duplex (TDD) technology, a dedicated reference signal is designed, so as to help a receiver to determine channel quality.

However, the LTE TDD is implemented in a half-duplex mode, and receiving a signal and sending a signal are not happened simultaneously; and therefore, a reference signal used for determining channel quality and data are sent in different subframes respectively. Channel quality obtained by receiving the reference signal may differ greatly from that when the data is sent. In this case, if the data is still sent according to the previously obtained channel quality, it is very likely that the QoS requirements cannot be met.

SUMMARY

An example, non-limiting objective of the present application is to provide a method and an apparatus for transmitting data.

According to a first aspect of at least one example embodiment of the present application, a method for transmitting data is provided, comprising:

receiving at least one reference signal sent by a receiver through a channel when sending data to the receiver through the channel; and resending the data according to the at least one reference signal.

According to a second aspect of at least one example embodiment of the present application, a method for transmitting data is provided, comprising:

receiving at least one reference signal sent by a receiver through a channel when sending data to the receiver through the channel; and changing a coding scheme of the data according to the at least one reference signal.

According to a third aspect of at least one example embodiment of the present application, an apparatus for transmitting data is provided, comprising:

a sending module, configured to send data to a receiver through a channel;

a receiving module, configured to receive at least one reference signal sent by the receiver through the channel when the sending module sends the data to the receiver through the channel; and a processing module, configured to resend the data according to the at least one reference signal.

According to a fourth aspect of at least one example embodiment of the present application, another apparatus for transmitting data is provided, comprising:

a sending module, configured to send data to a receiver through a channel;

a receiving module, configured to receive at least one reference signal sent by the receiver through the channel when the sending module sends the data to the receiver through the channel; and a processing module, configured to change a coding scheme of the data according to the at least one reference signal.

According to a fifth aspect of at least one example embodiment of the present application, another apparatus for transmitting data is provided, comprising a memory and a processor, wherein the memory is configured to store an instruction, and the processor is configured to execute the instruction, so as to perform the following steps:

receiving at least one reference signal sent by a receiver through a channel when sending data to the receiver through the channel; and resending the data according to the at least one reference signal.

According to a sixth aspect of at least one example embodiment of the present application, another apparatus for transmitting data is provided, comprising a memory and a processor, wherein the memory is configured to store an instruction, and the processor is configured to execute the instruction, so as to perform the following steps:

receiving at least one reference signal sent by a receiver through a channel when sending data to the receiver through the channel; and changing a coding scheme of the data according to the at least one reference signal.

With the method and the apparatus for transmitting data in one or more of the example embodiments of the present application, a problem that QoS cannot be ensured due to a lag of a reference signal in conventional data transmission is avoided, and the quality of data transmission can be improved.

DETAILED DESCRIPTION

Example embodiments of the present application are further described below in detail with reference to the accompanying drawings and embodiments. The following embodiments are used for describing the present application, but are not intended to limit the scope of the present application.

A person skilled in the art may understand that in the embodiments of the present application, sequence numbers of the following processes do not mean execution orders. The execution orders of the processes should be determined according to functions and internal logic of the processes, and should not be construed as any limitation on the example embodiments of the present application.

In addition, the terms such as "first" and "second" in the present application are used only to differentiate different steps, devices, modules, or the like, and neither represent any specific technical meaning, nor indicate any logical relationship between the terms.

Figure 1:
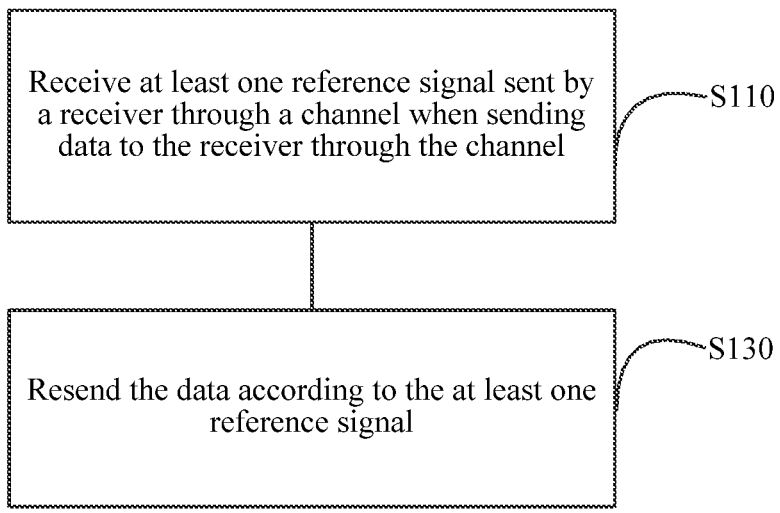
FIG. 1 is a schematic flowchart of a method for transmitting data according to an example embodiment of the present application.

FIG. 1 is a schematic flowchart of a method for transmitting data according to an embodiment of the present application. Referring to FIG. 1, the method comprises:

S110: Receive at least one reference signal sent by a receiver through a channel when sending data to the receiver through the channel.

S130: Resend the data according to the at least one reference signal.

With the method for transmitting data in this embodiment of the present application, a problem that QoS cannot be ensured due to a lag of a reference signal in conventional data transmission is avoided, and the quality of data transmission can be improved.

In this embodiment of the present application, different channels may be distinguished according to frequencies. In an optional manner, channels with a same frequency may be considered as a same channel. In another optional manner, channels a frequency offset between which is not greater than a frequency threshold may also be considered as a same channel.

Figure 2:
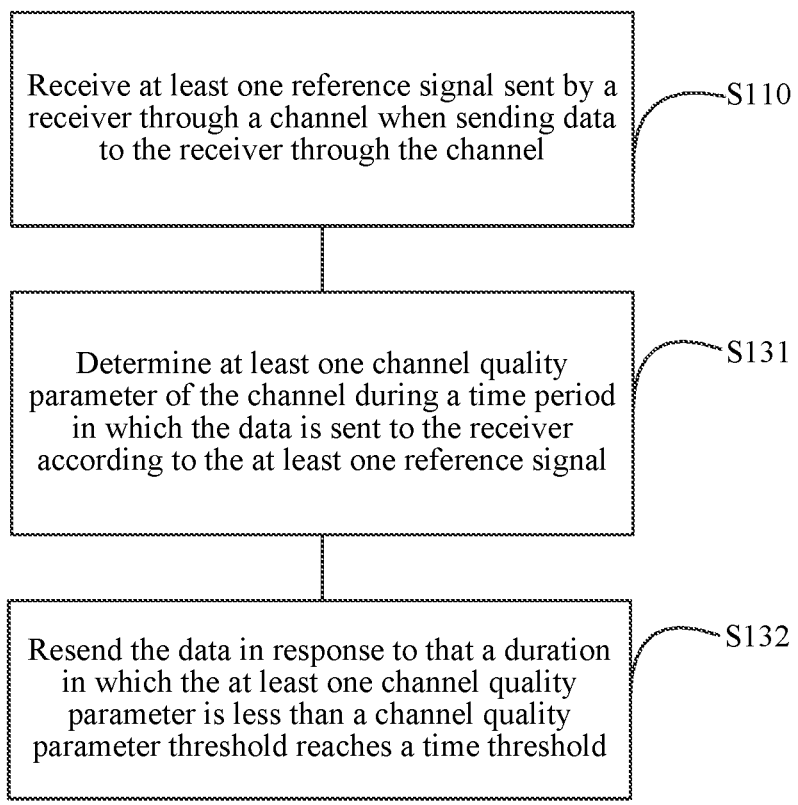
FIG. 2 is a schematic flowchart of another method for transmitting data according to an example embodiment of the present application.

Optionally, as shown in FIG. 2, in an embodiment of the present application, the foregoing block (S130) of resending the data according to the at least one reference signal may comprise:

S131: Determine at least one channel quality parameter of the channel during a time period in which the data is sent to the receiver according to the at least one reference signal.

In this embodiment of the present application, the channel quality parameter may be a parameter associated with one or more parameters that can be used for measuring channel quality, for example, the channel quality parameter may be associated with one or more of the following parameters: signal-to-noise ratio (SNR), carrier-to-noise ratio (CNR), signal-to-interference-plus-noise ratio (SINR), carrier-to-interference-plus-noise ratio (CINR), bit error ratio (BER), channel attenuation, latency, channel state information (CSI), channel transmission matrix, channel quality indicator (CQI), and the like.

The at least one channel quality parameter during the time period in which the data is sent to the receiver can be obtained according to the at least one reference signal, thereby accurately determining a change status of the channel quality in the entire data sending process.

S132: Resend the data in response to that a duration in which the at least one channel quality parameter is less than a channel quality parameter threshold reaches a time threshold.

Figure 3:
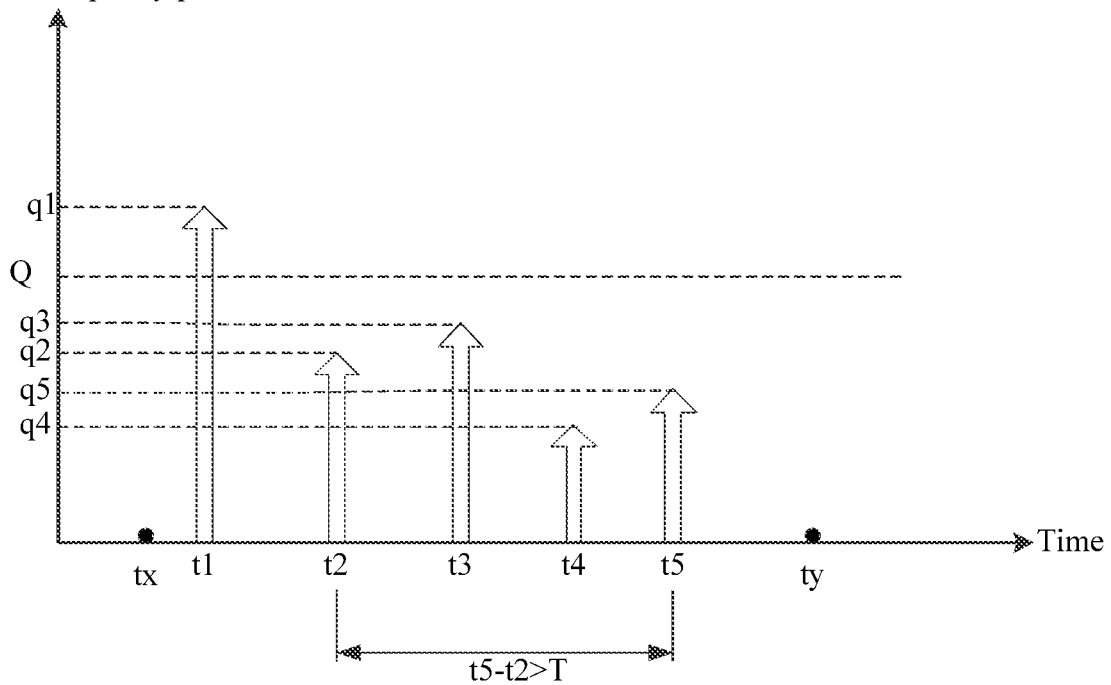
FIG. 3 is a schematic diagram of a relationship between a channel quality parameter obtained according to a reference signal and time in an example application scenario of the present application.

Descriptions are made below by using a specific scenario as an example. As shown in FIG. 3, it is assumed that a time period from a time point tx to a time point ty is the time period in which the data is sent to the receiver in this embodiment of the present application. In this time period, data is sent to the receiver on the one hand and five reference signals from the receiver are received on the other. Channel quality parameters q1, q2, q3, q4, and q5 at time points t1, t2, t3, t4, and t5 are respectively obtained by calculation according to the five reference signals. Exemplarily, q1, q2, q3, q4, and q5 may be SNRs of the channel at the time points t1, t2, t3, t4, and t5 respectively; or q1, q2, q3, q4, and q5 may be parameters associated with SNRs and EBRs of the channel at the time points t1, t2, t3, t4, and t5 respectively; or q1, q2, q3, q4, and q5 may be parameters associated with other parameters for measuring channel quality at the time points t1, t2, t3, t4, and t5 respectively, which are not specifically limited in this embodiment of the present application. In this scenario, it is assumed that q2, q3, q4, and q5 all are less than a channel quality parameter threshold Q, and a duration in which a channel quality parameter is less than the channel quality parameter threshold (that is, t2 to t5) exceeds a time threshold T. Thus, it can be determined that channel quality is degraded in the time period from t2 to t5, and a portion of the data sent in this time period may not be received by the receiver, or the portion of the data sent in this time period is received by the receiver but a decoding error rate is relatively high. Therefore, in this embodiment of the present application, current data transmission may be ended at the time point t5, and current data may be retransmitted in a current subframe or a next subframe available for sending, so as to ensure that the receiver can receive the data part.

Figure 4:
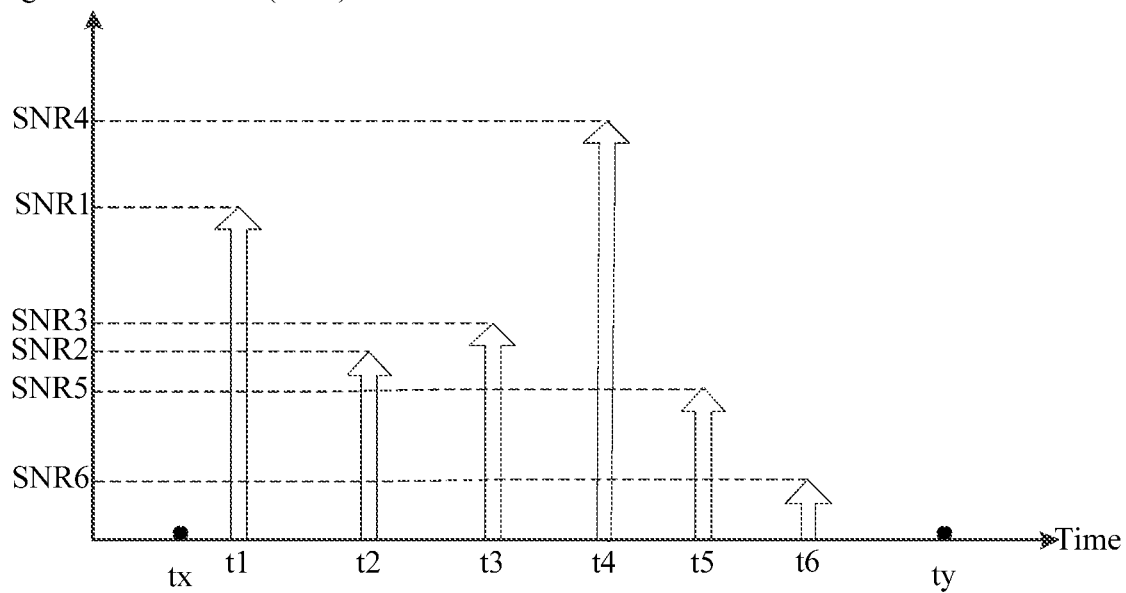
FIG. 4 is a schematic diagram of a relationship between a channel quality parameter obtained according to a reference signal and time in another example application scenario of the present application.

In another application scenario, as shown in FIG. 4, it is assumed that a time period from a time point tx to a time point ty is the time period in which the data is sent to the receiver in this embodiment of the present application. In this time period, data is sent to the receiver on the one hand and six reference signals from the receiver are received on the other. SNRs of the channel SNR1, SNR2, SNR3, SNR4, SNR5, and SNR6 at time points t1, t2, t3, t4, t5, and t6 are respectively obtained by calculation according to the six reference signals. In this scenario, in a time period from t1 to t2, a channel quality parameter may be a parameter q12 associated with (SNR1+SNR2); in a time period from t2 to t3, a channel quality parameter may be a parameter q23 associated with (SNR2+SNR3); in a time period from t3 to t4, a channel quality parameter may be a parameter q34 associated with (SNR3+SNR4); in a time period from t4 to t5, a channel quality parameter may be a parameter q45 associated with (SNR4+SNR5); and in a time period from t5 to t6, a channel quality parameter may be a parameter q56 associated with (SNR5+SNR6).

Assuming that q56 is less than a channel quality parameter threshold Q, it can be considered that channel quality is degraded in the time period from t5 to t6, and a portion of the data sent in this time period may not be received by the receiver, or the portion of the data sent in this time period is received by the receiver but a decoding error rate is relatively high. Therefore, in this embodiment of the present application, current data transmission may be ended at the time point t6, and current data may be retransmitted in a current subframe or a next subframe available for sending, so as to ensure that the receiver can receive the data part.

Optionally, in an example embodiment of the present application, an initial value of the channel quality parameter threshold and/or an initial value of the time threshold may be pre-determined according to empirical values. In this embodiment of the present application, the channel quality parameter threshold and/or the time threshold may not be changed in a data transmission process, or the channel quality parameter threshold and/or the time threshold may be adjusted according to feedback information of the receiver.

For example, receiving capabilities or processing capabilities of different receivers may be different, or may be changed due to impact of environmental factors, and when the initial value of the channel quality parameter threshold and/or the initial value of the time threshold is determined according to empirical values, an average status is mainly considered. The threshold set in that way may not be proper for different receivers. Using data retransmission as an example, for a receiver with a relatively high receiving capability and processing capability, the volume of retransmitted data may be excessive, and in this case, the threshold may be properly increased, so as to raise a trigger condition of the data retransmission; for a receiver with a relatively low receiving capability and processing capability, some data that needs to be retransmitted may not be retransmitted, and in this case, the threshold may be properly decreased, so as to lower a trigger condition of the data retransmission.

Exemplarily, the feedback information of the receiver may comprise but is not limited to: an identifier of a portion, which is correctly received, of the data, such as a sequence number of a segment of a data packet which is correctly received; or an identifier of a lost portion of the data, such as a sequence number of a segment of a data packet that is not received; or a decoding error rate of a portion, which is received, of the data; or indication information used for instructing to increase the channel quality parameter threshold and/or the time threshold; or indicating information used for instructing to decrease the channel quality parameter threshold and/or the time threshold.

In an example embodiment, the time threshold may be set to 0, that is, if it is determined that any channel quality parameter is less than the channel quality parameter threshold, wherein the any channel quality parameter may be a channel quality parameter corresponding to a time point or a channel quality parameter corresponding to a time period, data retransmission may be triggered without considering a duration in which the channel quality parameter is less than the channel quality parameter threshold.

Figure 5:
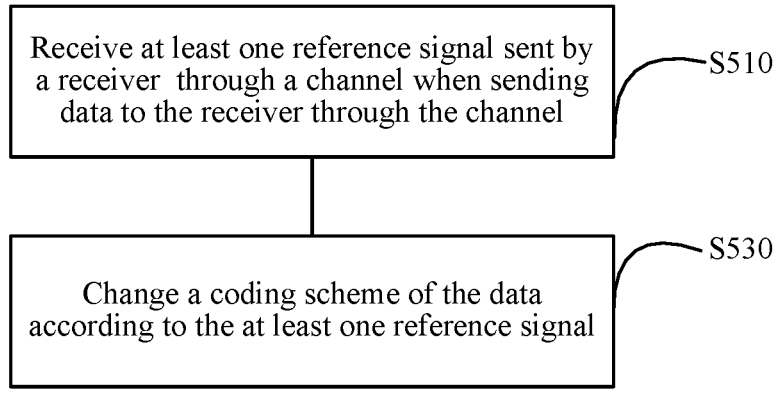
FIG. 5 is a schematic flowchart of a method for transmitting data according to another example embodiment of the present application.

FIG. 5 is a schematic flowchart of a method for transmitting data according to an embodiment of the present application. Referring to FIG. 5, the method comprises:

S510: Receive at least one reference signal sent by a receiver through a channel when sending data to the receiver through the channel.

S530: Change a coding scheme of the data according to the at least one reference signal.

With the method for transmitting data in this embodiment of the present application, a problem that QoS cannot be ensured due to a lag of a reference signal in conventional data transmission is avoided, and the quality of data transmission can be improved.

In this embodiment of the present application, different channels can be distinguished according to frequencies. In an optional manner, channels with a same frequency may be considered as a same channel. In another optional manner, channels a frequency offset between which is not greater than a frequency threshold may also be considered as a same channel.

Figure 6:
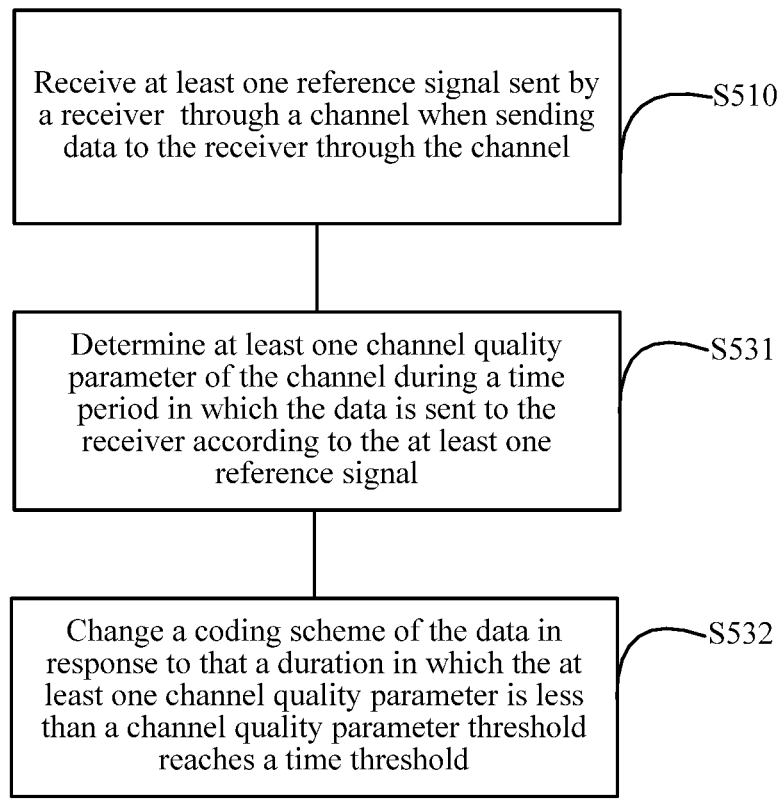
FIG. 6 is a schematic flowchart of another method for transmitting data according to another example embodiment of the present application.

Optionally, as shown in FIG. 6, in an embodiment of the present application, the foregoing block (S530) of changing a coding scheme of the data according to the at least one reference signal may comprise:

S531: Determine at least one channel quality parameter of the channel during a time period in which the data is sent to the receiver according to the at least one reference signal.

In this embodiment of the present application, the channel quality parameter may be a parameter associated with one or more parameters that can be used for measuring channel quality, for example, the channel quality parameter may be associated with one or more of the following parameters: SNR, CNR, SINR, CINR, BER, channel attenuation, latency, CSI, channel transmission matrix, CQI, and the like.

The at least one channel quality parameter during the time period in which the data is sent to the receiver can be obtained according to the at least one reference signal, thereby accurately determining a change status of the channel quality in the entire data sending process.

S532: Change the coding scheme of the data in response to that a duration in which the at least one channel quality parameter is less than a channel quality parameter threshold reaches a time threshold.

Figure 7:
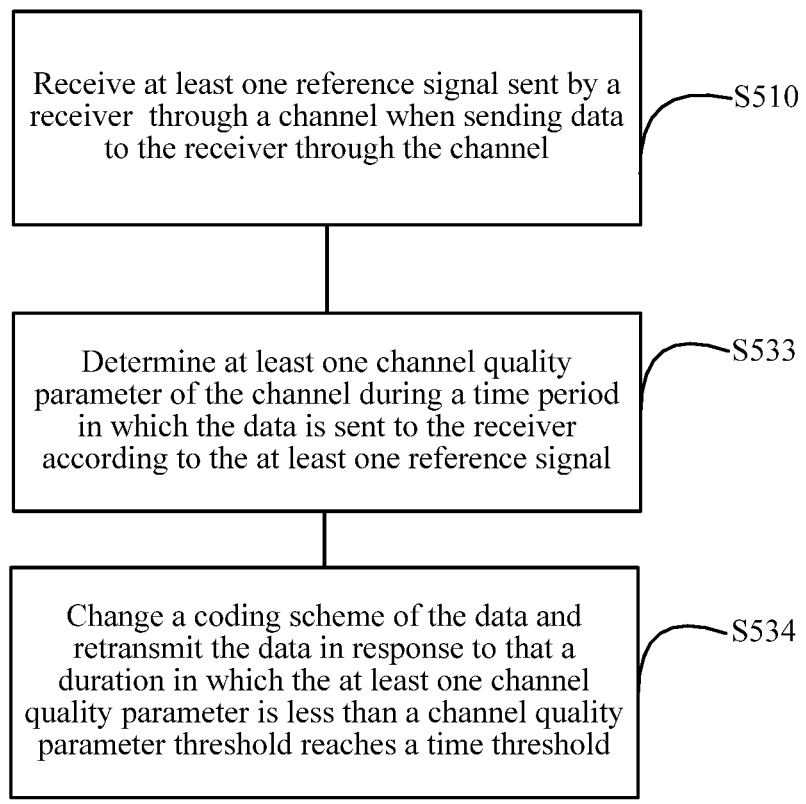
FIG. 7 is a schematic flowchart of another method for transmitting data according to another example embodiment of the present application.

Optionally, as shown in FIG. 7, in an example embodiment of the present application, the foregoing block (S530) of changing a coding scheme of the data according to the at least one reference signal may comprise:

S533: Determine at least one channel quality parameter of the channel during a time period in which the data is sent to the receiver according to the at least one reference signal.

S534: Change the coding scheme of the data and retransmit the data in response to that a duration in which the at least one channel quality parameter is less than a channel quality parameter threshold reaches a time threshold.

Still using FIG. 3 as an example, after it is determined that channel quality is degraded in the time period from t2 to t5, current data transmission may not be interrupted, but a coding scheme of data may be changed after the time point t5, for example, an LTE physical shared channel can support three coding schemes: QPSK, 16QAM, and 64QAM; these three coding schemes require different channel conditions; and generally, a higher coding scheme (QPSK<16QAM<64QAM) indicates a higher requirement on channel quality. Therefore, if current channel quality is poor, the decoding error rate of the data of the receiver may be reduced by descending the coding scheme. Alternatively, current data transmission is ended after the time point t5, and current data is retransmitted in a current subframe or a next subframe available for sending after a coding scheme of the data is changed.

In the example of FIG. 4, current data transmission may not be interrupted, but a coding scheme of data is changed after the time point t6. Alternatively, current data transmission is ended after the time point t6, and current data is retransmitted in a current subframe or a next subframe available for sending after a coding scheme of the data is changed.

Optionally, in an example embodiment of the present application, an initial value of the channel quality parameter threshold and/or an initial value of the time threshold may be pre-determined according to empirical values. In this embodiment of the present application, the channel quality parameter threshold and/or the time threshold may not be changed in a data transmission process, or the channel quality parameter threshold and/or the time threshold may be adjusted according to feedback information of the receiver.

For example, receiving capabilities or processing capabilities of different receivers may be different, or may be changed due to impact of environmental factors, and when the initial value of the channel quality parameter threshold and/or the initial value of the time threshold is determined according to empirical values, an average status is mainly considered. The threshold set in that way may not be proper for different receivers. Using data retransmission as an example, for a receiver with a relatively high receiving capability and processing capability, the volume of retransmitted data may be excessive, and in this case, the threshold may be properly increased, so as to raise a trigger condition of the data retransmission; for a receiver with a relatively low receiving capability and processing capability, some data that needs to be retransmitted may not be retransmitted, and in this case, the threshold may be properly decreased, so as to lower a trigger condition of the data retransmission.

Exemplarily, the feedback information of the receiver may comprise but is not limited to: an identifier of a portion, which is correctly received, of the data, such as a sequence number of a segment of a data packet which is correctly received; or an identifier of a lost portion of the data, such as a sequence number of a segment of a data packet that is not received; or a decoding error rate of a portion, which is received, of the data; or indication information used for instructing to increase the channel quality parameter threshold and/or the time threshold; or indicating information used for instructing to decrease the channel quality parameter threshold and/or the time threshold.

In an example embodiment, the time threshold may be set to 0, that is, if it is determined that any channel quality parameter is less than the channel quality parameter threshold, wherein the any channel quality parameter may be a channel quality parameter corresponding to a time point or a channel quality parameter corresponding to a time period, change of a coding scheme of the data may be triggered without considering a duration in which the channel quality parameter is less than the channel quality parameter threshold.

Optionally, in this embodiment of the present application, a payload of the reference signal may be null; and optionally, a header of the reference signal may be the same as a header part of the data.

In an example embodiment of the present application, in order to save bandwidth resources, the receiver may send one reference signal, so as to help the transmitter to determine the channel quality.

In another example embodiment of the present application, in order to determine a trend of changes of channel quality with time more accurately, the receiver may send two or more than two reference signals, so as to help the transmitter to determine the channel quality.

The reference signals may be continuously sent during the time period in which the transmitter sends the data through the channel, or be sent at intervals, for example, the reference signals may be sent one by one at an interval of at least one symbol.

Optionally, two parties of communication may start data transmission after the channel is available upon application, and therefore, after the channel is available upon the application, it can be considered that the transmitter starts sending the data through the channel, and at the same time, the sending of the at least one reference signal may be started.

Optionally, the channel may be a dedicated channel or a shared channel.

Figure 8:
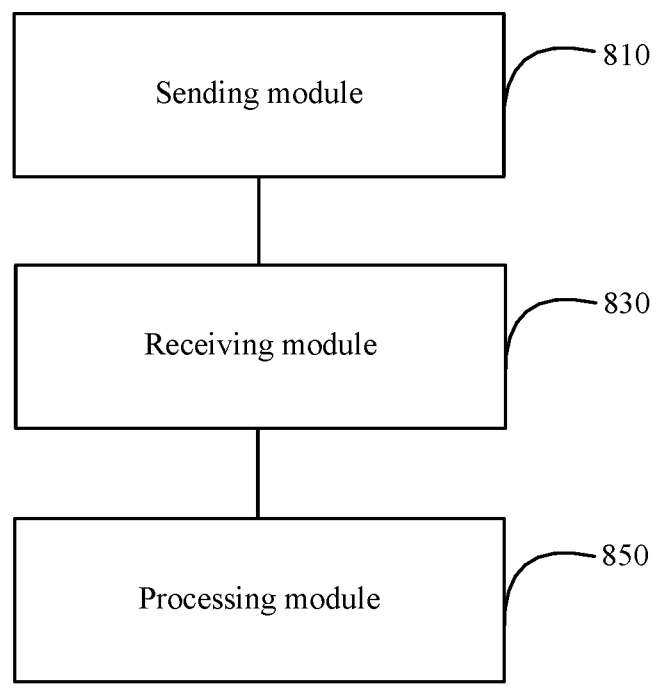
FIG. 8 is a schematic structural diagram of an apparatus for transmitting data according to an example embodiment of the present application.

FIG. 8 is a schematic structural diagram of an apparatus for transmitting data according to an embodiment of the present application. Referring to FIG. 8, the apparatus comprises:

a sending module 810, configured to send data to a receiver through a channel;

a receiving module 830, configured to receive at least one reference signal sent by the receiver through the channel when the sending module sends the data to the receiver through the channel; and a processing module 850, configured to resend the data according to the at least one reference signal.

Figure 9:
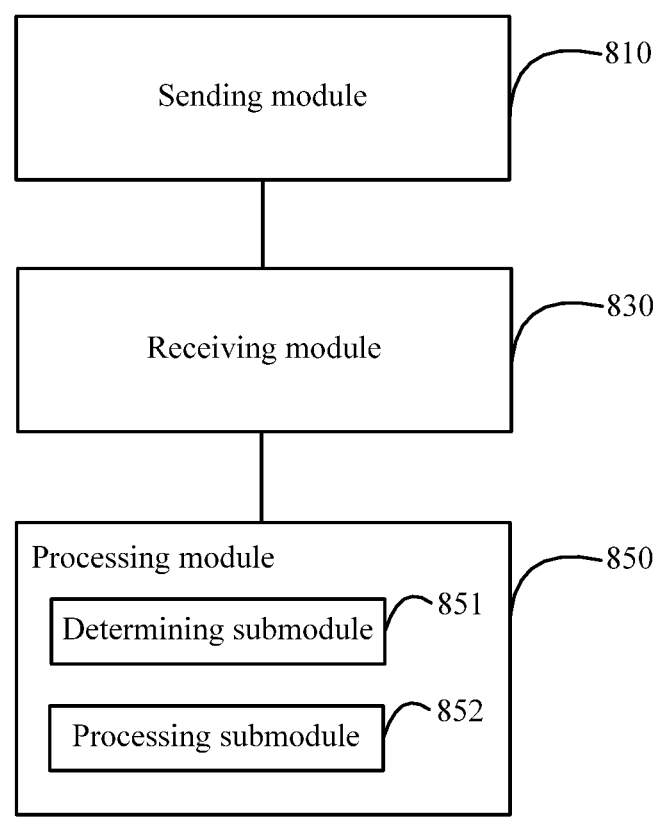
FIG. 9 is a schematic structural diagram of another apparatus for transmitting data according to an example embodiment of the present application.

Optionally, as shown in FIG. 9, the processing module 850 may comprise:

a determining submodule 851, configured to determine at least one channel quality parameter of the channel during a time period in which the data is sent to the receiver according to the at least one reference signal; and a processing submodule 852, configured to resend the data in response to that a duration in which the at least one channel quality parameter is less than a channel quality parameter threshold reaches a time threshold.

Figure 10:
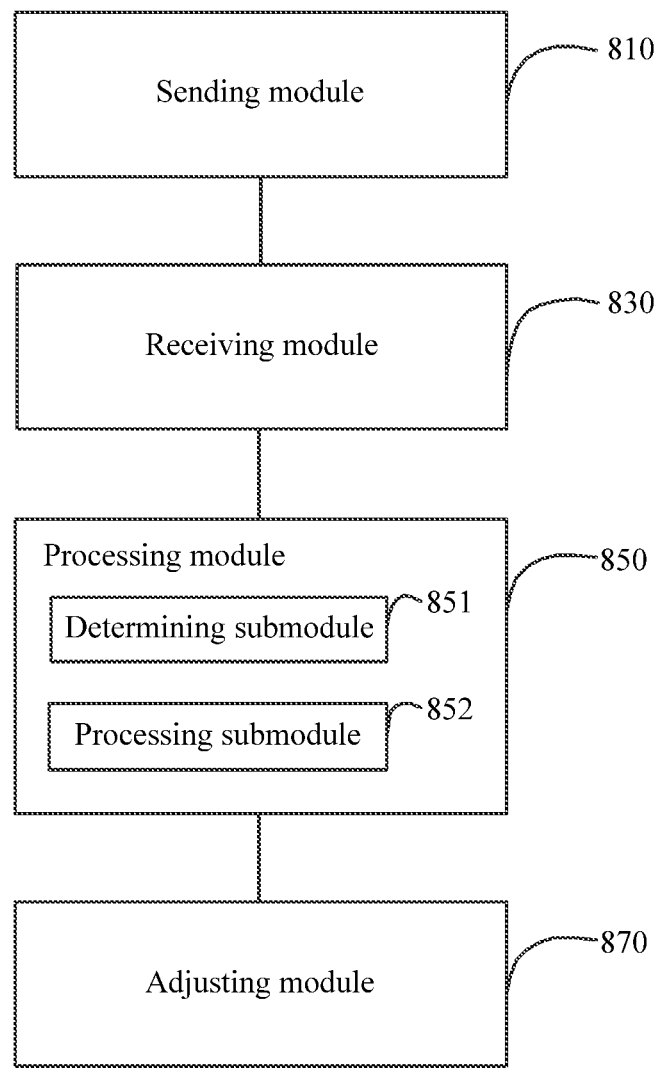
FIG. 10 is a schematic structural diagram of another apparatus for transmitting data according to an example embodiment of the present application.

Optionally, as shown in FIG. 10, the apparatus may further comprise:

an adjusting module 870, configured to adjust the channel quality parameter threshold and/or the time threshold according to feedback information of the receiver.

With the apparatus for transmitting data in the embodiment of the present application, a problem that QoS cannot be ensured due to a lag of a reference signal in conventional data transmission is avoided, and the quality of data transmission can be improved.

Figure 11:
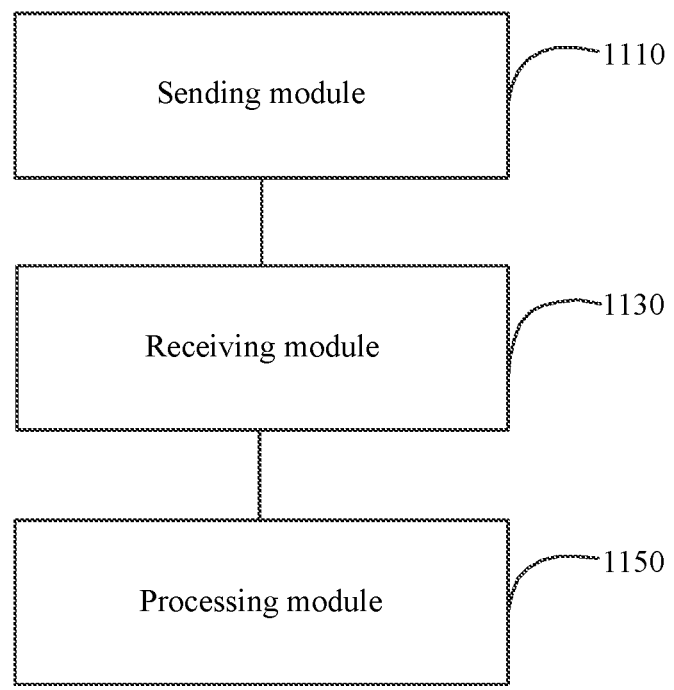
FIG. 11 is a schematic structural diagram of an apparatus for transmitting data according to another example embodiment of the present application.

FIG. 11 is a schematic structural diagram of an apparatus for transmitting data according to another embodiment of the present application. Referring to FIG. 11, the apparatus comprises:

a sending module 1110, configured to send data to a receiver through a channel;

a receiving module 1130, configured to receive at least one reference signal sent by the receiver through the channel when the sending module sends the data to the receiver through the channel; and a processing module 1150, configured to change a coding scheme of the data according to the at least one reference signal.

Figure 12:
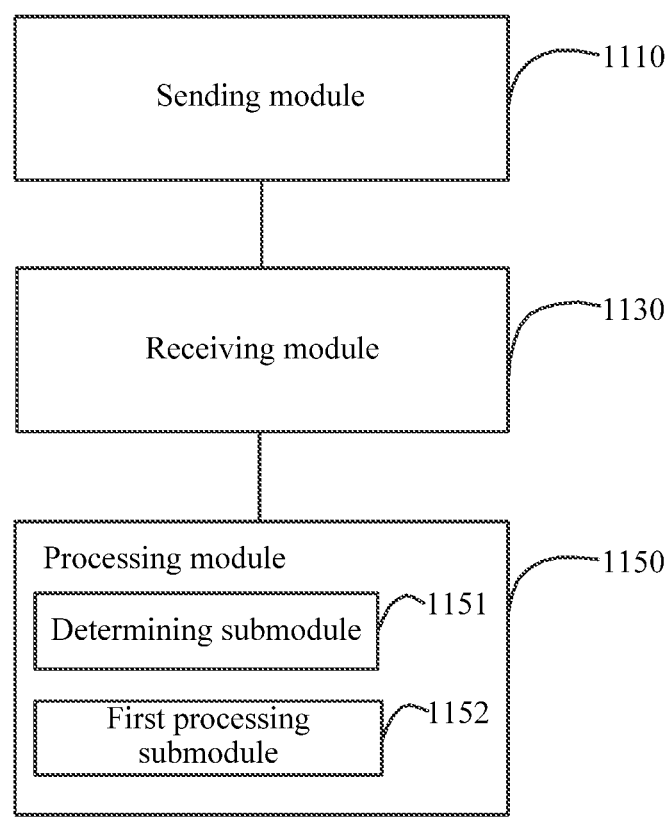
FIG. 12 is a schematic structural diagram of another apparatus for transmitting data according to another example embodiment of the present application.

Optionally, as shown in FIG. 12, the processing module 1150 may comprise:

a determining submodule 1151, configured to determine at least one channel quality parameter of the channel during a time period in which the data is sent to the receiver according to the at least one reference signal; and a first processing submodule 1152, configured to change the coding scheme of the data in response to that a duration in which the at least one channel quality parameter is less than a channel quality parameter threshold reaches a time threshold.

Figure 13:
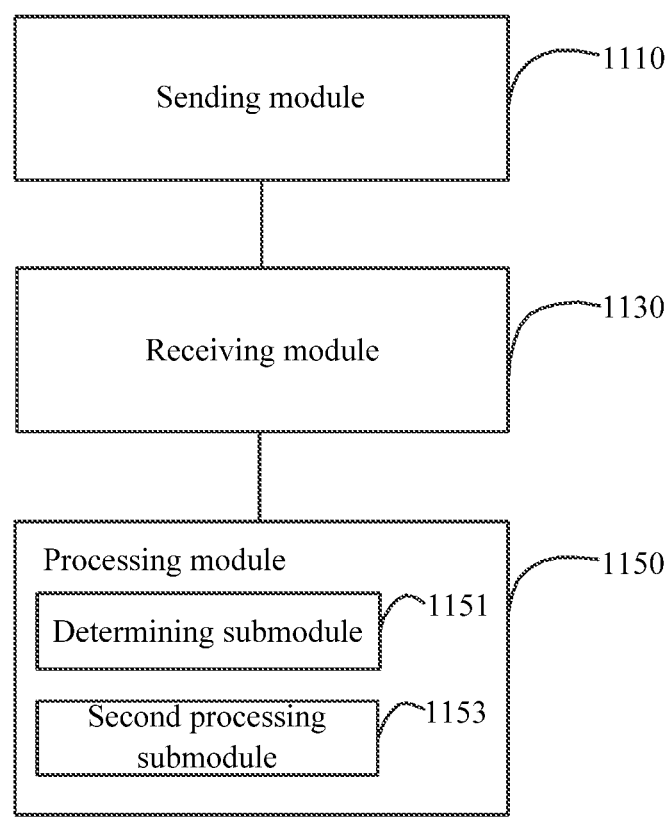
FIG. 13 is a schematic structural diagram of an apparatus for transmitting data according to another example embodiment of the present application.

Optionally, as shown in FIG. 13, the processing module 1150 may comprise:

a determining submodule 1151, configured to determine at least one channel quality parameter of the channel during a time period in which the data is sent to the receiver according to the at least one reference signal; and a second processing submodule 1153, configured to change the coding scheme of the data and resend the data in response to that a duration in which the at least one channel quality parameter is less than a channel quality parameter threshold reaches a time threshold.

Figure 14:
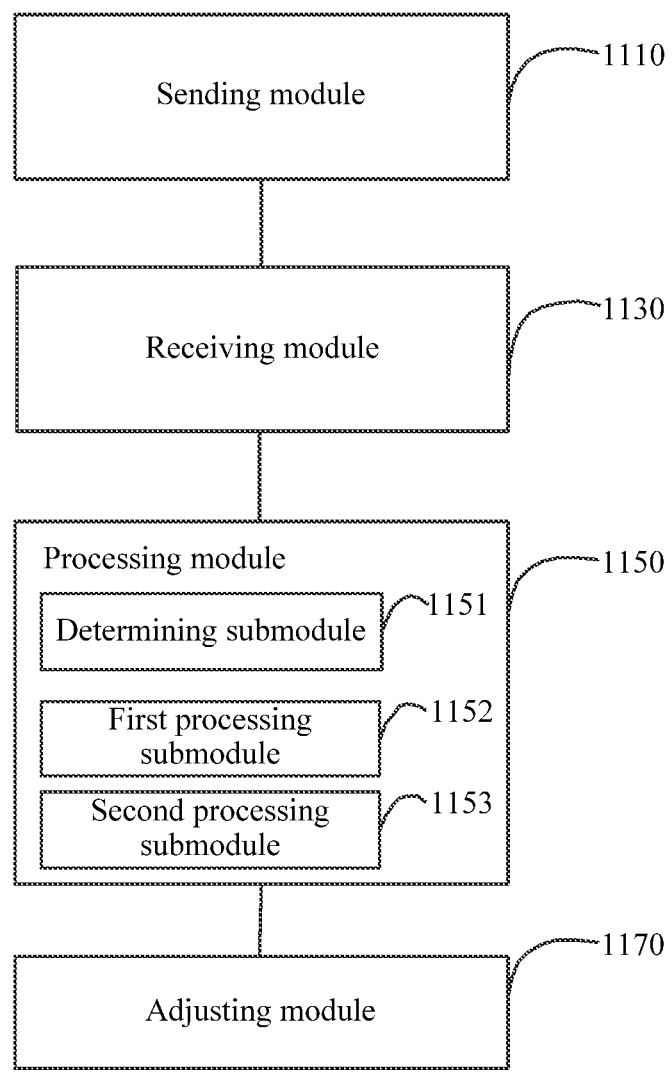
FIG. 14 is a schematic structural diagram of an apparatus for transmitting data according to another example embodiment of the present application.

Optionally, as shown in FIG. 14, the apparatus may further comprise:

an adjusting module 1170, configured to adjust the channel quality parameter threshold and/or the time threshold according to feedback information of the receiver.

Another embodiment of the present application further provides an apparatus for transmitting data, comprising a memory and a processor, wherein the memory is configured to store an instruction, and the processor is configured to execute the instruction, so as to perform the following steps:

receiving at least one reference signal sent by a receiver through a channel when sending data to the receiver through the channel; and resending the data according to the at least one reference signal.

The processor may be a central processing unit (CPU), or an application specific integrated circuit (ASIC), or may be configured to be one or more integrated circuits configured to implement an embodiment of a method for transmitting data.

The memory may be any medium that can store program code, such as a USB flash drive, a removable hard disk, a read-only memory (ROM), a random access memory (RAM), a magnetic disk, or an optical disc.

Another embodiment of the present application further provides an apparatus for transmitting data, comprising a memory and a processor, wherein the memory is configured to store an instruction, and the processor is configured to execute the instruction, so as to perform the following steps:

receiving at least one reference signal sent by a receiver through a channel when sending data to the receiver through the channel; and changing a coding scheme of the data according to the at least one reference signal.

It may be clearly understood by a person skilled in the art that, for the purpose of convenient and brief descriptions, the foregoing method for transmitting data may be implemented by the foregoing apparatus for transmitting data of the present application, reference may be made to the description of corresponding processes in the foregoing embodiments of the method for transmitting data, and details are not described herein again.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a ROM, a RAM, a magnetic disk, or an optical disc.

The foregoing example embodiments are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be subject to the claims.

What is claimed is:

1. A method, comprising:
receiving, by a system comprising a processor, at least one reference signal from a receiver through a channel when sending data to the receiver through the channel; and
resending the data according to the at least one reference signal,
wherein the resending the data according to the at least one reference signal comprises:
determining at least one channel quality parameter of the channel during a time period in which the data is sent to the receiver according to the at least one reference signal; and
resending the data in response to determining that a duration, in which the at least one channel quality parameter is less than a channel quality parameter threshold, reaches a time threshold.

2. The method of claim 1, further comprising:
adjusting the channel quality parameter threshold or the time threshold according to feedback information of the receiver.

3. A method, comprising:
receiving, by a system comprising a processor, at least one reference signal from a receiver through a channel when sending data to the receiver through the channel; and changing a coding scheme of the data according to the at least one reference signal,
wherein the changing the coding scheme of the data according to the at least one reference signal comprises:
determining at least one channel quality parameter of the channel during a time period in which the data is sent to the receiver according to the at least one reference signal; and
changing the coding scheme of the data in response to determining that a duration, in which the at least one channel quality parameter is less than a channel quality parameter threshold, reaches a time threshold.

4. The method of claim 3, wherein the changing the coding scheme of the data according to the at least one reference signal further comprises:
determining at least one channel quality parameter of the channel during a time period in which the data is sent to the receiver according to the at least one reference signal; and
changing the coding scheme of the data and retransmitting the data in response to determining that a duration, in which the at least one channel quality parameter is less than a channel quality parameter threshold, reaches a time threshold.

5. The method of claim 3, further comprising:
adjusting the channel quality parameter threshold or the time threshold according to feedback information of the receiver.

6. An apparatus, comprising:
a processor; and
a memory that stores executable instructions that, when executed by the processor, facilitate performance of operations, comprising:
sending data to a receiver via a channel;
receiving a reference signal sent by the receiver via the channel when the data is being sent to the receiver via the channel;
determining a channel quality parameter of the channel during a time period in which the data is sent to the receiver according to the reference signal; and
resending the data according to the reference signal,
wherein the resending the data is in response to determining that a duration, in which the channel quality parameter is less than a channel quality parameter threshold, has reached a time threshold.

7. The apparatus of claim 6, wherein the operations further comprise:
adjusting the channel quality parameter threshold or the time threshold according to feedback information of the receiver.

8. An apparatus, comprising:
a processor; and
a memory that stores executable instructions that, when executed by the processor, facilitate performance of operations, comprising:
sending data to a receiver via a channel;
receiving a reference signal sent by the receiver via the channel when the data is sent to the receiver via the channel;
determining a channel quality parameter of the channel during a time period in which the data is sent to the receiver according to the reference signal; and
changing a coding scheme of the data according to the reference signal,
wherein the changing the coding scheme of the data is in response to determining that a duration, in which the channel quality parameter is less than a channel quality parameter threshold, has reached a time threshold.

9. The apparatus of claim 8, wherein the changing the coding scheme of the data further comprises resending the data and is in response to determining that the duration has reached the time threshold.

10. The apparatus of claim 8, wherein the operations further comprise:
adjusting the channel quality parameter threshold or the time threshold according to feedback information of the receiver.

11. An apparatus for transmitting data, comprising a memory and a processor, wherein the memory is configured to store an instruction, and the processor is configured to execute the instruction, resulting in performance of operations, comprising:
receiving at least one reference signal from a receiver via a channel when sending data to the receiver via the channel; and
resending the data according to the at least one reference signal,
wherein the resending the data according to the at least one reference signal comprises:
determining at least one channel quality parameter of the channel during a time period in which the data is sent to the receiver according to the at least one reference signal; and
resending the data in response to determining that a duration, in which the at least one channel quality parameter is less than a channel quality parameter threshold, reaches a time threshold.

12. The apparatus of claim 11, wherein the operations further comprise:
adjusting the channel quality parameter threshold or the time threshold prior to the resending the data according to the at least one reference signal.

13. The apparatus of claim 11, wherein the operations further comprise:
adjusting the channel quality parameter threshold or the time threshold according to feedback information of the receiver.

14. An apparatus for transmitting data, comprising a memory and a processor, wherein the memory is configured to store an instruction, and the processor is configured to execute the instruction, so as to perform operations, comprising:
receiving at least one reference signal from a receiver via a channel when sending data to the receiver via the channel; and
changing a coding scheme of the data according to the at least one reference signal,
wherein the changing the coding scheme of the data according to the at least one reference signal comprises:
determining at least one channel quality parameter of the channel during a time period in which the data is sent to the receiver according to the at least one reference signal; and
changing the coding scheme of the data in response to determining that a duration, in which the at least one channel quality parameter is less than a channel quality parameter threshold, reaches a time threshold.

15. The apparatus of claim 14, wherein the operations further comprise:
resending the data, in response to the changing the coding scheme of the data, according to the at least one reference signal.

16. The apparatus of claim 14, wherein the operations further comprise:
adjusting the channel quality parameter threshold or the time threshold according to feedback information of the receiver.

17. A non-transitory computer readable storage device comprising executable instructions that, in response to execution, cause a device comprising a processor to perform operations, comprising:
receiving a reference signal from a receiver via a channel concurrently with sending data to the receiver via the channel; and
resending the data according to the reference signal,
wherein the resending the data according to the reference signal comprises:
determining a channel quality parameter of the channel during a time period in which the data is sent to the receiver according to the reference signal; and
resending the data in response to determining that a duration, in which the channel quality parameter is less than a channel quality parameter threshold, reaches a time threshold.

18. The non-transitory computer readable storage device of claim 17, wherein the operations further comprise:
adjusting the channel quality parameter threshold according to feedback information of the receiver.

19. A non-transitory computer readable storage device comprising executable instructions that, in response to execution, cause a device comprising a processor to perform operations, comprising:
receiving at least one reference signal from a receiver through a channel concurrently with sending data to the receiver through the channel; and
changing a coding scheme of the data according to the at least one reference signal,
wherein the changing the coding scheme of the data according to the at least one reference signal comprises:
determining at least one channel quality parameter of the channel during a time period in which the data is sent to the receiver according to the at least one reference signal; and
changing the coding scheme of the data in response to determining that a duration, in which the at least one channel quality parameter is less than a channel quality parameter threshold, reaches a time threshold.

20. The non-transitory computer readable storage device of claim 19, wherein the operations further comprise:
adjusting the time threshold according to feedback information of the receiver.

* * * * *